UNITED STATES PATENT OFFICE.

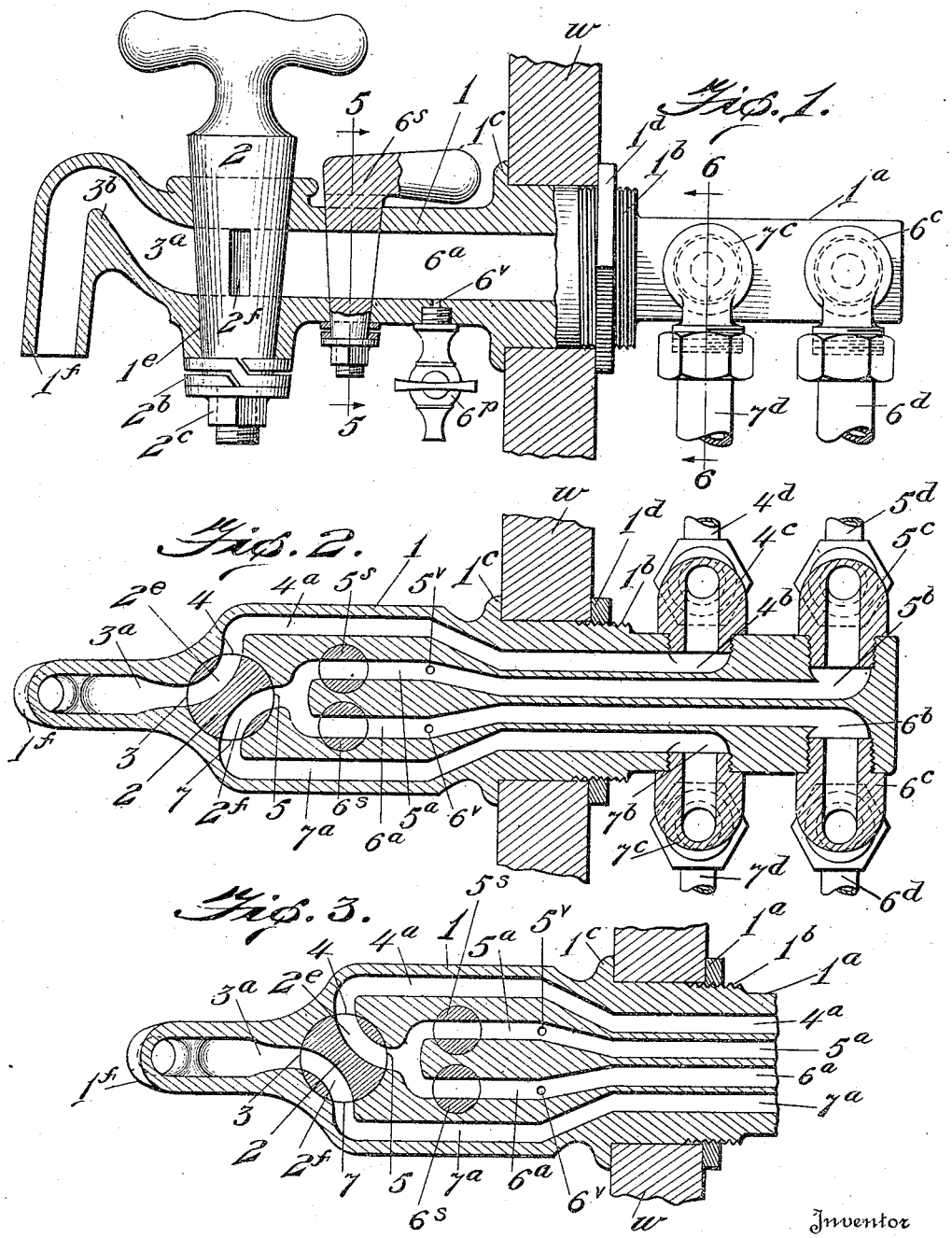

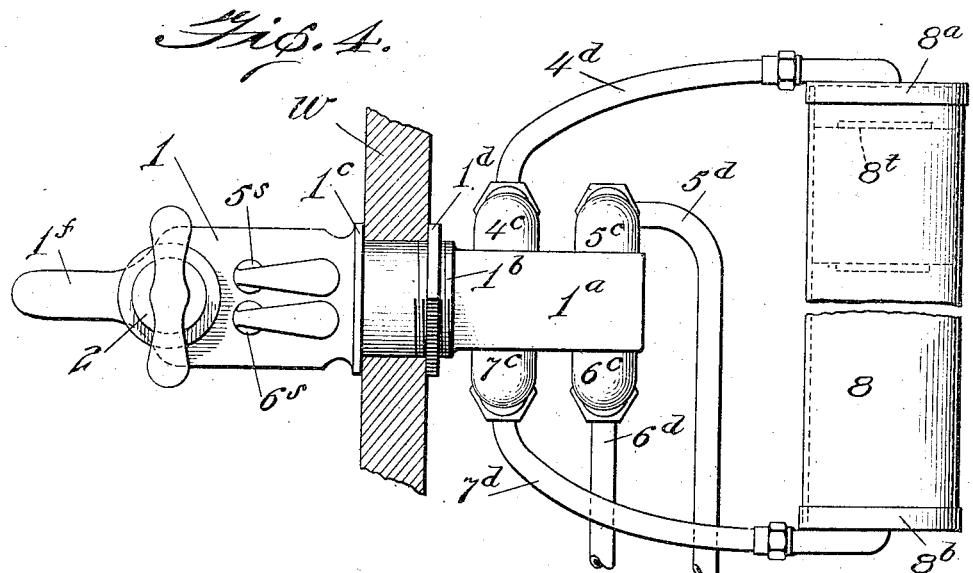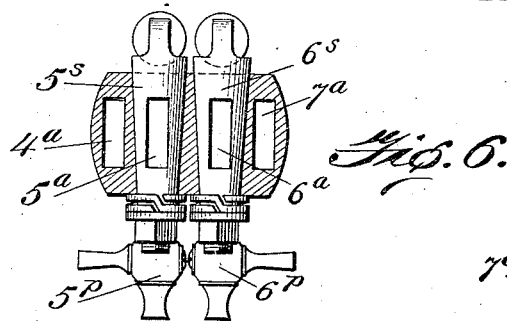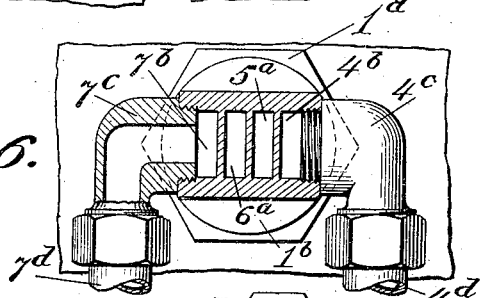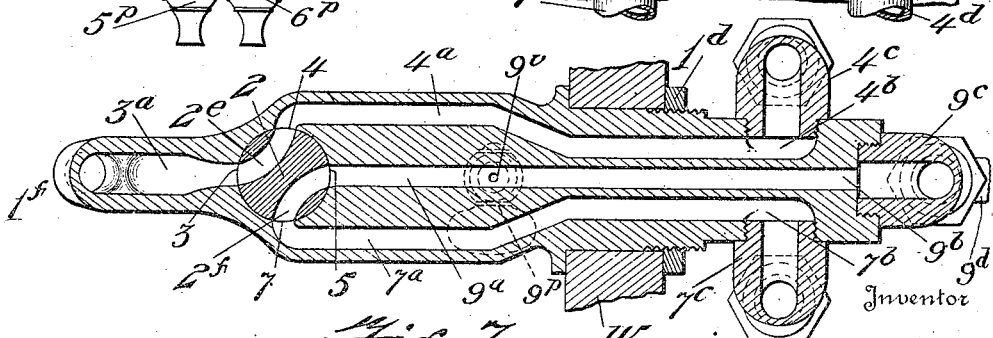

CHARLES F. BROWN, OF NEW YORK, N. Y., ASSIGNOR OF ONE-HALF TO ARTHUR D. DICKERSON, OF NEW YORK, N. Y.

FAUCET FOR DISPENSING LIQUIDS.

1,262,630.   Specification of Letters Patent.   Patented Apr. 16, 1918.

Application filed November 10, 1915. Serial No. 60,745.

*To all whom it may concern:*

Be it known that I, CHARLES F. BROWN, a citizen of the United States, residing at New York, borough of Manhattan, and State of New York, have invented certain new and useful Improvements in Faucets for Dispensing Liquids; and I hereby declare that the following is a full, clear, and exact description thereof, reference being had to the accompanying drawings, which form part of this specification.

This invention relates to liquid measuring and dispensing apparatus, and is a novel faucet for dispensing liquids, to be used in connection with liquid measuring and cooling devices; which can be readily installed and used in connection with the so called "coolers" commonly used to cool charged liquids where they are retailed.

The novel faucet is adapted to dispense the same kind of liquid from one or two containers; or to dispense one liquid from one container; or to dispense a mixture of two different liquids from separate containers.

The complete apparatus comprises a measuring vessel, a movable piston in said measuring vessel adapted to be actuated by the liquid; means for alternately admitting liquid to the vessel at opposite ends or sides of said piston; the novel dispensing faucet; and suitable pipe connections between the faucet and the measuring vessel and the liquid containers.

I will explain one practical form of the invention as illustrated in the accompanying drawings, and summarize in the claims the essential features and combinations of parts which I desire to protect.

In said drawings:—

Figure 1 is a part side elevation and part central vertical and longitudinal section of the faucet.

Fig. 2 is a longitudinal horizontal section thereof.

Fig. 3 is a detail section similar to Fig. 2 showing the faucet adjusted in another position.

Fig. 4 is a detail diagrammatical plan view of the complete apparatus, parts being broken away.

Fig. 5 is a detail section on the line 5—5, Fig. 1.

Fig. 6 is a detail section on the line 6—6, Fig. 1.

Fig. 7 is a horizontal longitudinal section of a modification of the faucet.

In the embodiment of the invention illustrated in the drawings the faucet comprises a main body 1, having a reduced rear portion $1^a$, and an intermediate enlarged externally threaded shank portion $1^b$ which is adapted to fit in an opening in the wall W to which the faucet is attached, said shank having an annular flange $1^c$ at its front adapted to abut against the front of the wall to which the faucet is attached, and the faucet secured to this wall by means of this flange and a nut $1^d$ screwed on the threaded portion $1^b$.

Near its front end the faucet has a vertically disposed valve chamber $1^e$ in which is fitted a preferably tapered valve 2 which may be held closely but yieldingly to its seat by means of a spring washer $2^b$, and a nut $2^c$ screwed on the reduced lower end of the valve.

The valve chamber $1^e$ has four preferably equi-distant ports 3, 4, 5 and 7. Port 3 communicates with a passage $3^a$, leading first upwardly and then downwardly through the forward goose-neck end $1^f$ of the body. Preferably the bottom $3^b$ of the inner curve of the neck of the passage $3^a$ lies above the top of the other fluid passages in the faucet, for a purpose hereinafter explained.

The port 4 communicates with a return passage $4^a$ which extends rearwardly through the body and shank and into the part $1^a$, and there communicates with a lateral outlet $4^b$, which may be connected by a pipe joint $4^c$, or other suitable means to a pipe $4^d$ hereinafter referred to.

The port 5 communicates with a supply passage $5^a$ which extends back through the body and shank to an outlet $5^b$ in part $1^a$, which outlet may be connected by a pipe-joint $5^c$ to a pipe $5^d$ hereinafter referred to.

Port 5 also communicates with a supply passage $6^a$ which extends through the body and shank to another lateral outlet $6^b$ which may be connected by a pipe joint $6^c$ to a pipe $6^d$. The forward ends of the passages $6^a$ and $5^a$ may unite at the port 5 as indicated.

The port 7 communicates with a return passage 7ª which extends back through the body and shank to a lateral opening 7ᵇ, in part 1ª which opening may be connected by a pipe joint to a pipe 7ᵈ.

The valve 2 is provided with the two similar adjacent ports 2ᵉ and 2ᶠ. In one position of the valve 2, as shown in Fig. 2, one of the valve ports establishes communication between the passages 4ª and 3ª, and simultaneously the other valve port establishes communication between passages 5ª, 6ª and passage 7. In the position of the valve 2 shown in Fig. 3, one of the valve ports establishes communication between passages 4ª and 5ª, 6ª; while the other valve port establishes communication between the passages 7ª and 3ª.

Interposed in the passage 5ª near the front part of the body is a stop cock 5ˢ, which may be readily formed by boring a conical valve seat in the body 1 and fitting a similarly tapered stop cock 5ˢ therein, as indicated in the drawings. Similarly passage 6ª is provided with a stop cock 6ˢ. Normally these stop cocks 5ˢ and 6ˢ should be kept in open position (as shown in Figs. 2 and 3) so as not to obstruct the flow of fluid from the passages 5ª and 6ª; but either of these stop cocks may be closed at will, for a purpose hereinafter specified.

Between the stop cock 5ˢ and the opening 5ᵇ, passage 5ª is provided with a vent 5ᵛ closed by a pet cock 5ᵖ. Similarly between the stop cock 6ˢ and the opening 6ᶜ, passage 6ª is provided with a vent 6ᵛ closed by a pet cock 6ᵖ.

The main valve 2, stop cocks 5ˢ, 6ˢ and pet cocks 5ᵖ, 6ᵖ are all located in the main body of the faucet and in front of the wall W and are all readily accessible.

The complete apparatus is adapted to dispense at each operation a predetermined quantity of liquid, for instance, one pint, which is accomplished by employing a measuring vessel having a piston which is actuated by the liquid so at each operation of the device a predetermined quantity of liquid is delivered.

The measuring vessel 8 (see Fig. 4) is preferably formed of a metal cylinder closed at its ends by heads 8ª and 8ᵇ; and within this vessel 8 is a slidable piston 8ᵗ, which may be of any suitable construction, adapted to prevent liquid passing by said piston from one end of the vessel to the other.

The head 8ª of the vessel has an opening connected by pipe 4ᵈ to the faucet opening 4ᵇ. The head 8ᵇ has an opening connected by pipe 7ᵈ with faucet opening 7ᵇ.

The opening 5ᵇ of the faucet is connected by pipe 5ᵈ with any desired liquid supply, or container, L; and opening 6ᵇ is similarly connected by pipe 6ᵈ to another liquid supply or container L'.

The pipes 5ᵈ, 6ᵈ may be connected intermediate the containers L, L' and the faucet with the cooling coils (not shown) in an ice box (not shown) so that the liquid will be cooled before reaching the vessel 8.

When the parts are in the position shown in Fig. 2 liquid can flow from containers L, L' through pipes 5ᵈ, 6ᵈ and supply passages 5ª, 6ˢ, port 2ᶠ, passage 7ª and pipe 7ᵈ into the end 8ᵇ of the measuring vessel 8, and force the piston 8ᵗ therein toward the end 8ª. At the same time liquid will be expelled from vessel 8 through the pipe 4ᵈ and through return passage 4ª, port 2ᵉ to discharge passage 3ª and be discharged. When the piston 8ᵗ reaches the end 8ª the flow of liquid to and from the vessel 8 will be stopped; and if the vessel is adapted to deliver a pint only a pint of fluid will have been discharged. If the valve 2 is then turned to the position indicated in Fig. 3, liquid will then flow as described from the containers L, L' to the port 5 and thence through port 2ᵉ, passage 4ª, and pipe 4ᵈ into the end 8ª of the container and force piston 8ᵗ toward the end 8ᵇ, and liquid will be simultaneously expelled from vessel 8 through the pipe 7ᵈ, return passage 7ª, port 2ᶠ and discharge passage 3ª.

If the vessels L, L' contain the same kind of liquid then only one kind of liquid will be dispensed. If the vessels L, L' contain different kinds of liquid, then a mixture of these liquids can be dispensed at each operation; and the relative quantities of such liquids in the mixture can be controlled by partially closing one or the other of the pet cocks 5ˢ, 6ˢ; so that any desired mixture of two liquids can be readily obtained.

The liquids are forced from the containers to the faucet by air pressure, so that the pressure of fluid in the passages 5ª, 6ª will be uniform, and the liquids from one passage 5ª or 6ª will not flow into the other.

In the modification shown in Fig. 7 instead of the two supply passages 5ª, 6ª only one passage 9ª is shown, which communicates with an outlet 9ᵇ at the rear end of the faucet which outlet may be connected by a pipe joint 9ᶜ with a pipe 9ᵈ which may be connected to a liquid supply or container. With such a faucet all the liquid would pass from the container through the passage 9ª, but would be directed alternately to opposite ends of the measuring vessel, no stop cock would be required, and only one vent 9ᵛ and pet cock 9ᵖ would be used.

It will be understood that under normal conditions the piston 8ᵗ will travel from one end of the vessel to the other, and this vessel is of such size that it will contain in addition to the piston say one pint of liquid, and when liquid is admitted into one end of the vessel a like amount is simultaneously expelled from the other end thereof, by the piston moving to the opposite end of the vessel. When the piston reaches either end of the vessel its movement is arrested, thus stopping the inflow and outflow of liquid, until the valve 2 is again shifted so as to admit liquid into that end of the vessel against which the piston has stopped, and simultaneously permit escape of liquid from the other end thereof.

When the apparatus is first started, or when a container is emptied the passages and pipes may be fully or partially filled with gas or air, which must be vented before a proper amount of liquid can be withdrawn. By opening the pet-cocks 6$^b$ or 5$^b$ any air or gas collected in the passages can be vented. These cocks should be closed as soon as liquid flows therethrough.

As above stated, the major parts of the apparatus may be placed within the ordinary ice box or cooler, and all the parts which have to be manipulated by the operator are on the front of the faucet outside of the box.

The pet-cocks 5$^b$, 6$^b$ enable the operator to determine which container is empty, if two containers, from both of which liquid is being withdrawn, are simultaneously used. If one container becomes empty before the other air would follow, and would be evidenced by a hissing noise when the valve 2 is opened. If this occurs the operator by opening the pet-cocks can easily determine whether the container connected with passage 5$^a$ or 6$^a$ is empty, because only gas or air will escape from the pet-cock in the passage connected with the empty container, while liquid will escape from the pet-cock of the passage connected with the full container. If, for example, the operator should find gas escaping from passage 5$^a$ he should close stop cock 5$^s$, and can continue withdrawing liquid from the container L' through the passage 6$^a$, while a full container is being connected to the pipe 5$^d$. After such container is connected to pipe 5$^d$ the pet cock 5$^p$ should be opened to vent any gas and air in the passage and pipes and stop cock 5$^s$ opened, and liquid can then be again withdrawn from both containers. Similarly if container L' should become exhausted the passage 6$^a$ can be closed and a full container substituted for container L'.

When making a change of containers communication between the ports 6$^c$ and 5$^c$ should be closed by the stop cock 5$^s$ or 6$^s$ to prevent siphoning or by-passing of fluid from one container to the other.

In operation it is only necessary to give the valve 2 a quarter turn to establish communication between one end of the vessel 8 and the atmosphere through the discharge outlet 1$^c$; at the next quarter turn of the valve communication is established between the other end of the vessel and the atmosphere. Therefore the operator by simply giving the valve successive quarter turns can draw as many successive pints, or measures of liquid as he wishes. To prevent dripping of liquid from the open faucet passages I make the discharge passage 3$^a$ goose necked with the top of the portion 3$^b$ lying above the fluid passages as indicated by the dotted line in passage 3$^a$, in Fig. 1. This prevents any annoying leakage of liquid after the proper amount of liquid has been discharged from the measuring vessel.

To entirely close communication between the atmosphere and both ends of the measuring vessel 8 valve 2 should be turned one-eighth, to an intermediate position.

By this invention the operator while at the faucet, can withdraw liquid in measured amounts from a plurality of containers; can determine which of the containers has become empty; can continue to draw from one container while another is being replaced; and has all the valves and cocks assembled compactly in one faucet in plain view and within easy reach.

What I claim is:

1. A liquid dispensing faucet comprising an elongated body provided with a plurality of longitudinal supply and return passages, a discharge passage and a valve chamber intermediate the discharge passage and the supply and return passages having ports communicating with all said passages; with a valve in said chamber provided with ports adapted to establish communication between a supply passage and a return passage, and simultaneously establish communication between the other return passage and the discharge.

2. A liquid dispensing faucet comprising an elongated body provided with two supply and two longitudinal return passages, a discharge passage and a valve chamber intermediate the discharge passage and the supply and return passages having ports communicating with all said passages; and a valve in said chamber provided with ports adapted to establish communication between one supply passage and two of the return passages, and simultaneously establish communication between the other return passage and the discharge.

3. A liquid dispensing faucet comprising an elongated body provided with a plurality of longitudinal supply and return passages, a discharge passage and a valve chamber intermediate the discharge passage and the supply and return passages having ports communicating with all said passages, and a valve in said chamber provided with ports adapted to establish communication between a supply passage and a return passage, and simultaneously establish communication between the other return passage and the discharge.

4. A liquid dispensing faucet comprising an elongated body provided with a plurality of longitudinal supply and return passages, a discharge passage and a valve chamber intermediate the discharge passage and the supply and return passages having ports communicating with all said passages, and a valve in said chamber provided with ports adapted to establish communication between one supply passage and two of the return passages, and simultaneously establish communication between the other return passage and the discharge; with a liquid supply connected with the supply passages and a liquid measuring device connected with the liquid return passages, substantially as described.

5. A liquid dispensing faucet comprising an elongated body provided with a plurality of longitudinal supply and return passages, a discharge passage and a valve chamber intermediate the discharge passage and the supply and return passages having ports communicating with all said passages, and a valve in said chamber provided with ports adapted to establish communication between a supply passage and a return passage, and simultaneously establish communication between the other return passage and the discharge; with a stop cock in each liquid supply passage whereby such passage may be closed or the amount of fluid passing therethrough regulated.

6. A liquid dispensing faucet comprising an elongated body provided with a plurality of longitudinal supply and return passages, a discharge passage and a valve chamber intermediate the discharge passage and the supply and return passages having ports communicating with all said passages; a valve in said chamber provided with ports adapted to establish communication between one supply passage and two of the return passages, and simultaneously establish communication between the other return passage and the discharge; and a stop cock in each liquid supply passage whereby such passage may be closed or the amount of fluid passing therethrough regulated; with a liquid measuring device connected with the liquid return passages, and a liquid supply connected with the supply passages.

7. A liquid dispensing faucet comprising an elongated body provided with a plurality of supply and return passages, a discharge passage and a valve chamber intermediate the discharge passage and the supply and return passages having ports communicating with all said passages; said discharge passage being bent so that the bottom of its uppermost portion is above the top level of the other fluid passages in the faucet, with a valve in said chamber provided with ports adapted to establish communication between a supply passage and a return passage, and simultaneously establish communication between the other return passage and the discharge.

8. A liquid dispensing faucet comprising an elongated body provided with a plurality of longitudinal supply and return passages, a discharge passage and a valve chamber intermediate the discharge passage and the supply and return passages having ports communicating with all said passages; and a valve in said chamber provided with two ports respectively adapted to establish communication between a supply passage and one of the return passages, and simultaneously establish communication between the other return passage and the discharge; with a liquid measuring vessel connected at opposite ends with the liquid return passages, and a liquid supply or container connected with the supply passages of said faucet.

9. A liquid dispensing faucet comprising an elongated body provided with a plurality of longitudinal supply and return passages, a discharge passage and a valve chamber intermediate the discharge passage and the supply and return passages having ports communicating with all said passages, said discharge passage being bent so that the bottom of its uppermost portion is above the top level of the other fluid passages in the faucet; with a valve in said chamber provided with ports adapted to establish communication between a supply passage and a return passage, and simultaneously establish communication between the other return passage and the discharge; a liquid supply connected with the supply passage; and a liquid measuring device connected with the liquid return passage.

10. A liquid dispensing faucet comprising an elongated body provided with a plurality of longitudinal supply and return passages, a discharge passage and a valve chamber intermediate the discharge passage and the supply and return passages having ports communicating with all said passages; means whereby the supply passages may be vented, and the failure of liquid detected; and a valve in said chamber provided with ports adapted to establish communication between one supply passage and two of the return passages, and simultaneously establish communication between the other return passage and the discharge.

11. A liquid dispensing faucet comprising an elongated body provided with a plurality of supply and return passages, a discharge passage and a valve chamber intermediate the discharge passage and the supply and return passages having ports communicating with all said passages; a valve in said chamber provided with ports adapted to establish communication between a supply passage and a return passage, and simultaneously establish communication between the other return passage and the discharge and means whereby the passages may be vented and the failure of liquid supply detected; with a liquid supply connected with the supply passage, and a liquid measuring device connected with the liquid return passage.

In testimony that I claim the foregoing as my own, I affix my signature in presence of two witnesses.

CHARLES F. BROWN.

Witnesses:
 A. D. DICKERSON,
 J. D. McMANUS.

Copies of this patent may be obtained for five cents each, by addressing the "Commissioner of Patents, Washington, D. C."